United States Patent
Srivastava et al.

(10) Patent No.: US 12,365,362 B2
(45) Date of Patent: Jul. 22, 2025

(54) SYSTEMS AND METHODS FOR BROKERING PEER-ASSISTED SAFETY MODELS FOR AUTONOMOUS AND ASSISTED-DRIVING VEHICLES

(71) Applicant: Intel Corporation, Santa Clara, CA (US)

(72) Inventors: Amar Srivastava, Banglaore (IN); Christian Maciocco, Portland, OR (US); Kshitij Arun Doshi, Tempe, AZ (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/645,725

(22) Filed: Dec. 22, 2021

(65) Prior Publication Data
US 2022/0111870 A1    Apr. 14, 2022

(51) Int. Cl.
*B60W 60/00* (2020.01)
*H04W 4/40* (2018.01)

(52) U.S. Cl.
CPC ..... *B60W 60/0016* (2020.02); *B60W 2756/10* (2020.02); *H04W 4/40* (2018.02)

(58) Field of Classification Search
None
See application file for complete search history.

(56) References Cited

U.S. PATENT DOCUMENTS

| | | | | |
|---|---|---|---|---|
| 10,324,463 | B1* | 6/2019 | Konrardy | G01S 19/39 |
| 10,434,935 | B1* | 10/2019 | Zhang | G08G 1/096725 |
| 10,726,642 | B1* | 7/2020 | Goluguri | G06Q 20/308 |
| 2010/0194593 | A1* | 8/2010 | Mays | B60W 10/184 |
| | | | | 340/905 |

(Continued)

FOREIGN PATENT DOCUMENTS

| | | |
|---|---|---|
| CN | 110356401 | 6/2020 |
| EP | 3264044 | 1/2018 |
| WO | WO-2020205597 A1 * 10/2020 | ......... B60W 30/182 |

OTHER PUBLICATIONS

"Connected services and systems", [Online]. Retrieved from the Internet: URL: https: www.bosch-mobility-solutions.com en solutions connectivity connectivity-solutions-2w , (Accessed on Aug. 11, 2021), 7 pgs.

*Primary Examiner* — Justin S Lee
(74) *Attorney, Agent, or Firm* — Schwegman Lundberg & Woessner, P.A.

(57) ABSTRACT

Disclosed herein are systems and methods for peer-assisted safety models for autonomous and assisted-driving vehicles. In an embodiment, a safety-model service receives a safety-model request for a safety model from a target vehicle. The safety-model service identifies, responsive to receiving the safety-model request, one or more source vehicles as safety-model input sources. The safety-model service receives safety-model data associated with the identified one or more source vehicles. The safety-model service generates, based on the safety-model request and the received safety-model data, a target-vehicle safety model for the target vehicle. The (Continued)

safety-model service transmits the target-vehicle safety model to the target vehicle for use by the target vehicle.

24 Claims, 9 Drawing Sheets

(56) References Cited

U.S. PATENT DOCUMENTS

| | | | |
|---|---|---|---|
| 2015/0179066 A1* | 6/2015 | Rider | G08G 1/165 |
| | | | 701/31.5 |
| 2017/0213462 A1* | 7/2017 | Prokhorov | G08G 1/166 |
| 2018/0053413 A1 | 2/2018 | Patil et al. | |
| 2019/0213881 A1* | 7/2019 | Bender | G08G 1/096775 |
| 2020/0074853 A1* | 3/2020 | Miller | G08G 1/012 |
| 2021/0009154 A1* | 1/2021 | Wray | G08G 1/163 |
| 2021/0097311 A1* | 4/2021 | McBeth | G08G 1/096775 |
| 2022/0126863 A1* | 4/2022 | Moustafa | G08G 1/096741 |
| 2023/0132512 A1* | 5/2023 | Clawson | B60W 60/0027 |
| | | | 701/26 |
| 2023/0377455 A1* | 11/2023 | Karapantelakis | G08G 1/0116 |

* cited by examiner

SYSTEMS AND METHODS FOR BROKERING PEER-ASSISTED SAFETY MODELS FOR AUTONOMOUS AND ASSISTED-DRIVING VEHICLES

TECHNICAL FIELD

Among other technical fields, embodiments of the present disclosure pertain to assisted-driving vehicles, autonomous vehicles, robots, machine learning, executable safety models, and, more particularly, to systems and methods for peer-assisted safety models for autonomous and assisted-driving vehicles of all types including cars, trucks, motorcycles, scooters, mopeds, rickshaws, and the like.

BACKGROUND

As autonomous (e.g., self-driving) and assisted-driving vehicles and other robots become more and more prevalent in today's modern society, it remains important to keep in mind the safety of drivers, passengers, pedestrians, and others. For this purpose, many autonomous and assisted-driving vehicles include what is known as a safety model, which is executed during operation of the vehicle. In operation, a typical safety model may compute various safety constraints, both with respect to static safety concerns (e.g., potholes, construction, sharp curves in the road, and the like) and with respect to dynamic safety concerns (e.g., pedestrians, other vehicles, falling trees, environmental conditions, and the like). Accordingly, many vehicles execute one or both of a static safety model and a dynamic safety model during operation.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
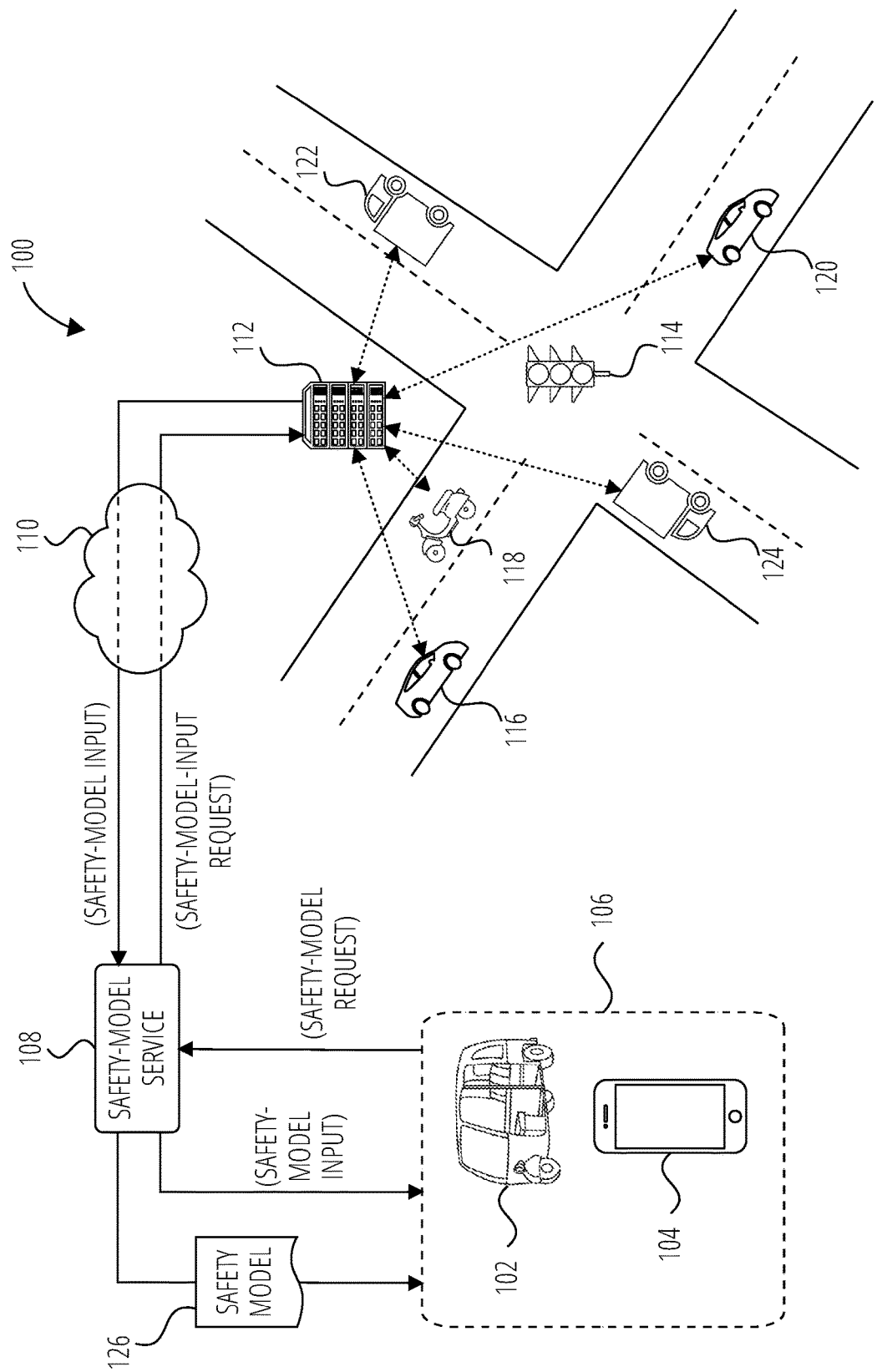
FIG. 1 depicts an example communication context, in accordance with at least one embodiment.

Embodiments of the present disclosure apply to numerous different types of autonomous and assisted-operation vehicles and other autonomous or semi-autonomous-agents and robots. For simplicity and not by way of limitation, the examples that are described most frequently in the present disclosure relate to assisted-driving vehicles. A given assisted driving vehicle may include a system that is known in the art as an advanced driver assistance system (ADAS). For shorthand, assisted-driving vehicles are referred to at times in this disclosure as "ADAS vehicles." One functional component of an example ADAS vehicle is a safety-module manager (or safety module or safety system, among other names that could be used). A typical safety-model manager executes a runtime safety model as a sort of safety "watchdog" during vehicle operation, to validate or change vehicle planning and control operations.

In accordance with at least one embodiment, in an ADAS vehicle, an implementation of a safety model may be configured to receive inputs from both onboard sensors (i.e., sensors on the ADAS vehicle) as well as a wireless-communication interface (from, e.g., other vehicles, infrastructure elements, mobile devices such as smartphones, and/or the like). Such an interface may operate according to Dedicated Short-Range Communication (DSRC), vehicle-to-vehicle (V2V) infrastructure, cellular networks, Wi-Fi networks, and/or one or more other suitable protocols, types of networks, and the like. As mentioned above, the safety model may be configured to assess both static safety constraints (e.g., potholes, sharp turns, and the like) and dynamic safety constraints (e.g., pedestrian movements, actions of other vehicles, falling rocks, environmental conditions like rain or fog, and the like). Safety models often take prevailing conditions (e.g., darkness, weather, and so forth) into account as well. In operation, if a given computed trajectory plan (including, e.g., a planned near-term setting for acceleration, brakes, turning, and/or the like) is deemed by a given safety model (or another functional component of the vehicle) to be unsafe (e.g., to be associated with less than a particular threshold aggregate safety metric), the vehicle may instead operate according to a constrained trajectory plan (i.e., a trajectory plan that has been modified so as to be constrained by safety constraints generated by the safety model). The safety model may compute such constraints on overall speed, driving distance between vehicles, acceleration, braking, turning radius, and/or the like. Safety models may alternatively be referred to as vehicle operation safety models (VSOMs).

There are many different types of vehicles on the road with many different types of ADASs. These ADASs may differ in terms of computing power, communications systems, onboard sensors, onboard-sensor configurations, and so forth. Moreover, different vehicles are simply different from one another when it comes to aspects such as number of wheels, vehicle size, and wheel base, as well as kinematic capabilities such as top speed, acceleration, braking distance, turn radius, maneuverability, stability, and/or the like. Embodiments of the present disclosure relate to vehicle safety aided by intelligent infrastructure safety services and vehicle collaboration. Vehicle accidents are a serious problem in many countries around the world, especially in locales in which a high number of lightweight vehicles (e.g., two-wheeled and three-wheeled vehicles, also referred to herein at times as "two-wheelers" and "three-wheelers") share the road with heavier four-wheelers, semi trucks, and the like. In general, fatality risk is much higher for those operating motorcycles as opposed to four-wheeled vehicles, for example. As such, improvements in safety for those operating two-wheelers and three-wheelers is important.

One issue in prior vehicles and vehicle-support systems is that two-wheelers (e.g., motorcycles, scooters, bicycles, etc.) and three-wheelers (e.g., motorized rickshaws) tend to have limited sensor arrays and computation resources as compared with vehicles having four or more wheels. Accordingly, safety model rules designed for large, more "complex" motor vehicles such as automobiles and trucks (e.g., Responsibility-Sensitive Safety from Mobileye®, or Safety Force Field from Nvidia®) do not necessarily fully apply to simpler vehicles and forms of transport. Embodiments of the present disclosure address this issue at least in part by leveraging the sensing and computation capabilities of more well-equipped vehicles for the benefit of vehicles such as two-wheelers and three-wheelers. In the parlance of this disclosure, two-wheelers and three-wheelers are characterized at times as being "lightweight vehicles," "less capable vehicles," "less well-equipped vehicles," "simple (or simpler) vehicles," and the like. Conversely, four-wheelers and larger vehicles are characterized in this disclosure at times using terms such as "heavyweight vehicles," "more capable vehicles," "more-equipped vehicles," "complex (or more complex) vehicles," and the like. In general, these terms relate to the levels of kinematic performance, computing power, and/or sensing equipment of these various vehicles, and may reflect other aspects as well.

In embodiments of the present disclosure, lightweight vehicles benefit from dynamic road and environment safety information models computed by heavyweight vehicles and/or one or more infrastructure elements. The lightweight vehicles may receive models and model-input data (e.g., feature data (a.k.a. "features")) from heavyweight vehicles and/or infrastructure elements via wireless infrastructure, e.g., V2X (which encompasses V2V and vehicle-to-infrastructure (V2I)), cellular networks, Wi-Fi networks, and/or one or more other suitable protocols, types of networks, and the like. Moreover, in at least some embodiments, the safety models that are computed for, received by, and executed by a given lightweight vehicle may reflect a transformation from the context of the heavyweight vehicle (e.g., more and/or different sensors, different vehicle kinematics, and so forth) to the context of the lightweight vehicle (e.g., fewer and/or different sensors, different vehicle dimensions and kinematics, and so forth). The lightweight vehicle in such a scenario is referred to often in the present disclosure as being the "target vehicle," in that a safety model and model-input data are created for and provided to that vehicle, whereas the complex vehicles providing the data are referred to herein at times as "source vehicles."

Moreover, the driving experience is different on many roads at different times due to factors such as the level of traffic on the road, the road conditions, differing local driving habits, vehicles having different characteristics, differing and changing prevailing weather conditions, and/or the like. Heavyweight vehicles often have deployed thereon a number of capabilities such as traction control, anti-locking braking system (ABS), and the like. Lightweight vehicles, on the other hand, tend to have limited sensors and limited onboard computing and communications equipment (and therefore capabilities). In embodiments of the present disclosure, lightweight vehicles benefit from safety models built specifically for them, as well as from data collected and provided by more complex vehicles. In some embodiments, that collected data is transformed into a format more suitable for processing by the target vehicle. Also, many of the embodiments described herein can be extended to pedestrians' mobile devices and numerous other types of endpoints. For example, a safety-model service in accordance with the present disclosure may create a safety model for a pedestrian and broadcast that model (from, e.g., one or more infrastructure elements such as roadside units (RSUs), or from cellular or Wi-Fi networks, and/or the like) to that user's mobile device in, e.g., cases of atypical and/or dangerous situations. Thus, in accordance with embodiments of the present disclosure, more capable vehicles share their real-time data for lightweight vehicles to use as inputs into the lightweight vehicles' own custom-built safety models.

Embodiments of the present disclosure include use of both static safety models and dynamic safety models. In some cases, in advance of a trip, a user may load one or more static safety models relevant to an expected route. In some embodiments, target vehicles can locally retune downloaded safety models as needed. Such models may be cached on the target vehicle and can be updated, deleted, and/or the like. For dynamic safety events, some embodiments of the present disclosure support perception and calculation of safety-related metrics for a target vehicle. Moreover, custom safety models built for particular target vehicles for particular times, locations, and the like can convert perceived safety events into actionable responses by the target vehicle.

In many cases, given the same road conditions at the same time with the same safety concerns, a given complex vehicle (executing its own complex safety model) and a given target vehicle (executing a provided target-vehicle safety model in accordance with the present disclosure) may well generate different decisions, recommendations, constraints, and so forth. For example, the lightweight vehicle may simply move to one side of a traffic lane to avoid a pothole whereas the complex vehicle may not have that option due to vehicle size, traffic, and so forth, and may therefore slow down in order to minimize the negative effects of encountering the pothole. And numerous other examples could be provided here and will occur to those of skill in the art having the benefit of the present disclosure.

One embodiment takes the form of a system that includes at least one hardware processor and also includes at least one memory storing instructions that, when executed by the at least one hardware processor, cause the at least one hardware processor to perform operations that include receiving a safety-model request for a safety model from a target vehicle. The operations also include identifying, responsive to receiving the safety-model request, one or more source vehicles as safety-model input sources. The operations also include receiving safety-model data associated with the identified one or more source vehicles, as well as generating, based on the safety-model request and the received safety-model data, a target-vehicle safety model for the target vehicle. The operations also include transmitting the target-vehicle safety model to the target vehicle for use by the target vehicle.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Further with respect to safety models, in at least some embodiments a safety model for a given vehicle is defined to be or at least include executable software that assesses the traffic context of the vehicle obtained through embedded sensors and/or externally (via, e.g., V2X services, cellular networks, Wi-Fi networks, and/or the like), and provides performance constraints to the driving behavior of the vehicle in real-time. In at least one embodiment, the functions of a safety model include acting as a watchdog with respect to the driving performance of the vehicle, whether the driving logic is executed through automation or a human driver, and providing constraints in the form of commands to the actuation mechanism of the vehicle or warnings to the human operator when unsafe situations are detected. Many safety models are designed in an attempt to strike a balance between the utility of the vehicle and the inherent risks of the real world.

In embodiments of the present disclosure a safety-model service communicates across transportation infrastructure and with other vehicles, in order to aggregate safety-relevant information and offer safety-model customization to target users. A safety-model service in accordance with an embodiment may continuously (e.g., frequently) aggregate data from roadside infrastructure sensors and connected vehicles. Safety events (e.g., safety model inputs) may be collected as logs and processed using principal components analysis (PCA), knowledge distillation, statistical averaging, and/or other applicable techniques. As described herein, in at least some embodiments, safety models are categorized as either static safety models or dynamic safety models.

In embodiments, static safety models relate at least in part to statically geolocated pre-known events. Some examples include road geometry such as safe velocities at sharp curves, approaching intersections with occlusions or areas under road construction or with potholes. Embodiments of the present disclosure map static safety events to dynamic capabilities (and restrictions) associated with a target vehicle. Such information may be transformed so as to be tailored to the target vehicle, even in cases in which reported safety data has been captured primarily by one type of vehicle (e.g., passenger cars). In an embodiment, static safety models for a specified region of interest are generated upon target-vehicle request and then cached by the target vehicle, only requiring GPS positioning along the route for runtime application. In some embodiments, visual landmarks are used as cues for driver actions.

In some embodiments, dynamic safety models relate at least in part to dynamic behaviors that result from interaction (or at least potential interaction) between the target vehicle and one or more agents on the road. Dynamic safety models typically require the use of real-time sensor information and kinematic-value assumptions. At least one embodiment involves the application of generalizable dynamic safety models that establish safety envelopes around the target vehicle, though these safety envelopes are customized through parametrization to the kinematic capabilities of the target vehicle. A dynamic safety model can be efficiently downloaded onto a target vehicle. In addition, a safety-model service in accordance with embodiments of the present disclosure maintains communication exchanges with the target vehicle during the trip to provide updated aggregated information regarding road users and updated parametrization for safety-envelope calculations specifically tailored to the target vehicle. A safety-model service may manage data processing from multiple sources, and may also manage quality of service to the target vehicle in connection with preparing and supporting updates to the dynamic safety model during the journey. In some embodiments, the target vehicle has the option to request a termination of this service or an update of the service along the journey.

FIG. 1 depicts an example communication context 100, in accordance with at least one embodiment. In the depicted example, a target vehicle 102 is a 3-wheeled motorized rickshaw. Moreover, also depicted is a target-vehicle mobile device 104 that may be associated with a primary operator of the target vehicle 102. The target vehicle 102 and the target-vehicle mobile device 104 are together represented as a target-vehicle system 106 in FIG. 1. Also depicted is a safety-model service 108 implemented at a computing system, server, or node that is communicatively connected with the target vehicle 102, and also via a network 110 with an edge node 112. In this depicted arrangement, the edge node 112 is associated with, and may control, a traffic light 114.

The edge node 112 is positioned near an example intersection of two streets, and may include and/or communicate with any number of cameras, radar sensors, lidar sensors, and/or the like as deemed suitable for a given implementation. In some embodiments, such as the one described below in connection with FIG. 2, the safety-model service 108 operates not as a standalone service but as a functional part of the edge node 112, which may be or include what is known as a roadside unit (RSU). And certainly numerous other potential arrangements could be used as well. Depicted as currently traveling in the vicinity of the traffic light 114 are a source vehicle 116, a source vehicle 118, a source vehicle 120, a source vehicle 122, and a source vehicle 124. In various situations, one or more of the source vehicles 116-124 may be more capable (e.g., more equipped) than the target vehicle 102.

Various communications are depicted in FIG. 1. In an example sequence, the target vehicle 102 transmits a safety-model request to the safety-model service 108, which responsively queries (e.g., sends out safety-model-input requests to) each of the source vehicles 116-124. Those source vehicles 116-124 may then respond with what is labeled safety-model input. In an embodiment, the safety-model service 108 then uses the provided safety-model input, as well as information from the safety-model request about the capabilities of the target vehicle 102, to build a custom safety model 126 for the target vehicle 102. The safety-model service 108 transmits the safety model 126 to the target vehicle 102 for use by the target vehicle 102 in operation. Moreover, the source vehicles 116-124 may continue to transmit safety-model-input data via the safety-model service 108 (or directly) to the target vehicle 102. In an embodiment, one or more features of the safety model 126 are values that are collected by one or more of the source vehicles 116-124. The target vehicle 102 has thus been provided with a safety model 126 that is more robust and more useful than a safety model that was built based only on the capabilities of the target vehicle 102 would likely be.

Figure 2:
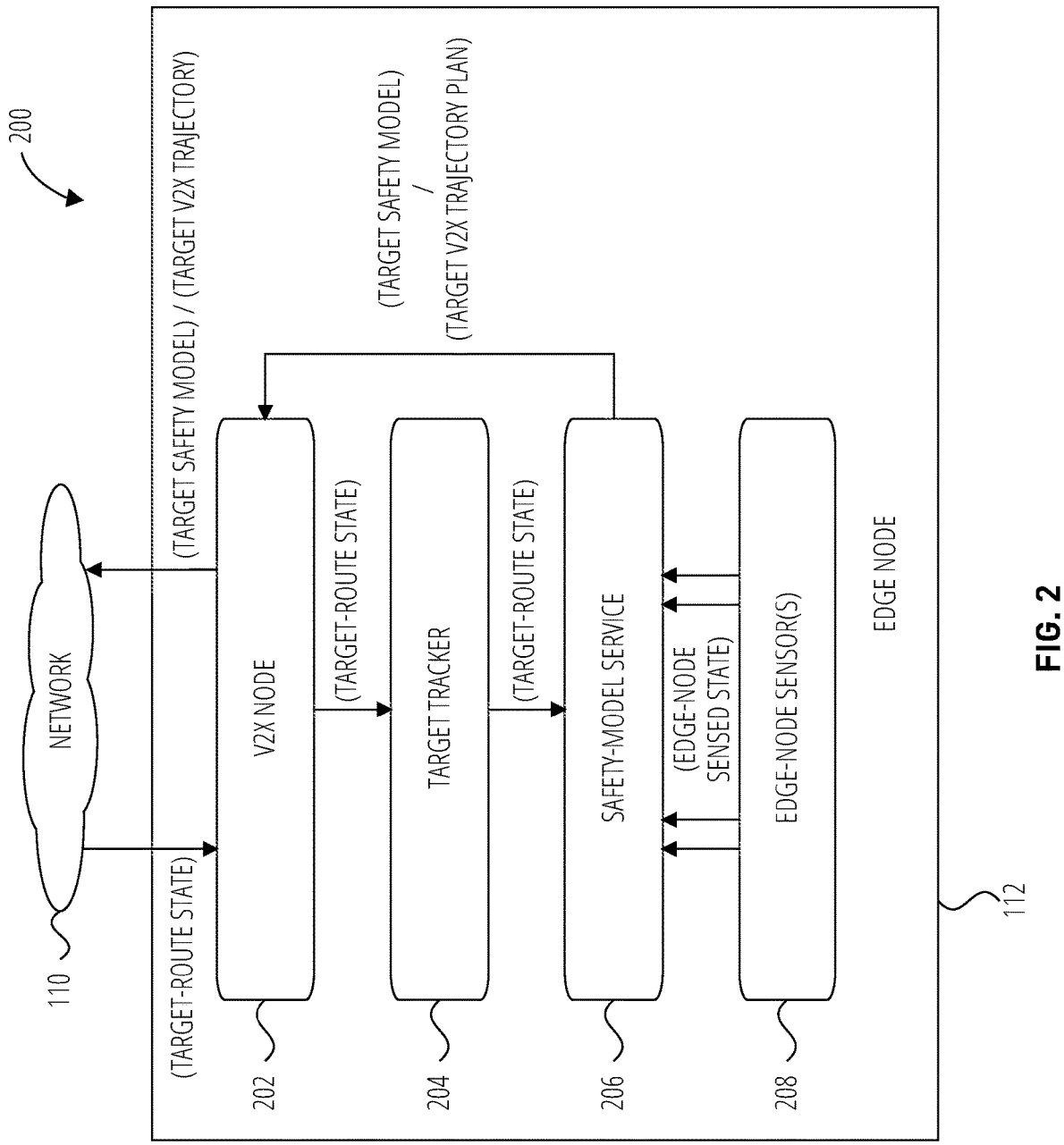
FIG. 2 depicts an example edge-node architecture, in accordance with at least one embodiment.

FIG. 2 depicts an example edge-node architecture 200, in accordance with at least one embodiment. In particular, FIG. 2 depicts the example edge-node architecture 200 of the edge node 112 from FIG. 1. As described above, what is shown in FIG. 2 is an example in which a safety-model service 206 within the edge node 112 functions in place of at least some of what is performed by the safety-model service 108 in the arrangement that is shown there. As described below, FIG. 2 depicts an embodiment in which a dynamic safety model is provided to the target vehicle 102 as well as customized trajectory updates for the safety model 126 to consider when executed by the target vehicle 102. As shown in FIG. 2, the edge-node architecture 200 includes a V2X node 202, a target tracker 204, the aforementioned safety-model service 206, and a set of one or more edge-node sensors 208.

The V2X node 202 may be used for communication by the edge node 112 with various different vehicles (V2V), infrastructure elements (V2I), and/or the like. In embodiments, the communications described herein related to safety-model requests, safety models, safety-model updates, model features, vehicle state, route state, target trajectories, and/or the like may be conducted via the V2X node 202. As shown, the V2X node 202 may exchange data via the network 110. In some embodiments, the edge node 112 may have one or more other communication interfaces as well, such as but not limited to 5G, LTE, Wi-Fi, Ethernet, fiber optics, and/or the like.

The target tracker 204 may function to provide updated information to the safety-model service 206 regarding the current position, state, and so forth of the target vehicle 102 (and, in some instances, one or more other target vehicles). The safety-model service 206 may carry out operations described herein as being performed by a safety-model service, and these operations may include one or more operations that are described herein as being performed by the safety-model service 108. The safety-model service 206 may receive safety-model requests from target vehicles, safety-model-refinement requests from target vehicles, model-input data from source vehicles, and sensor data from its own edge-node sensor 208, among other types of information that could be received by the safety-model service 206. Moreover, the safety-model service 206 transmits built safety models, refined safety models, requests to source vehicles for model-input data, target-vehicle trajectory plans, and/or the like.

The edge-node sensors 208 could include any number of cameras, radar sensors, lidar sensors, ambient-sound detectors, ambient-light detectors, temperature detectors, detectors for other weather conditions such as high winds, precipitation, and so forth. Moreover, the edge-node sensors 208 could include one or more of any other type of sensor deemed suitable by those of skill in the art for a given implementation.

Figure 3:
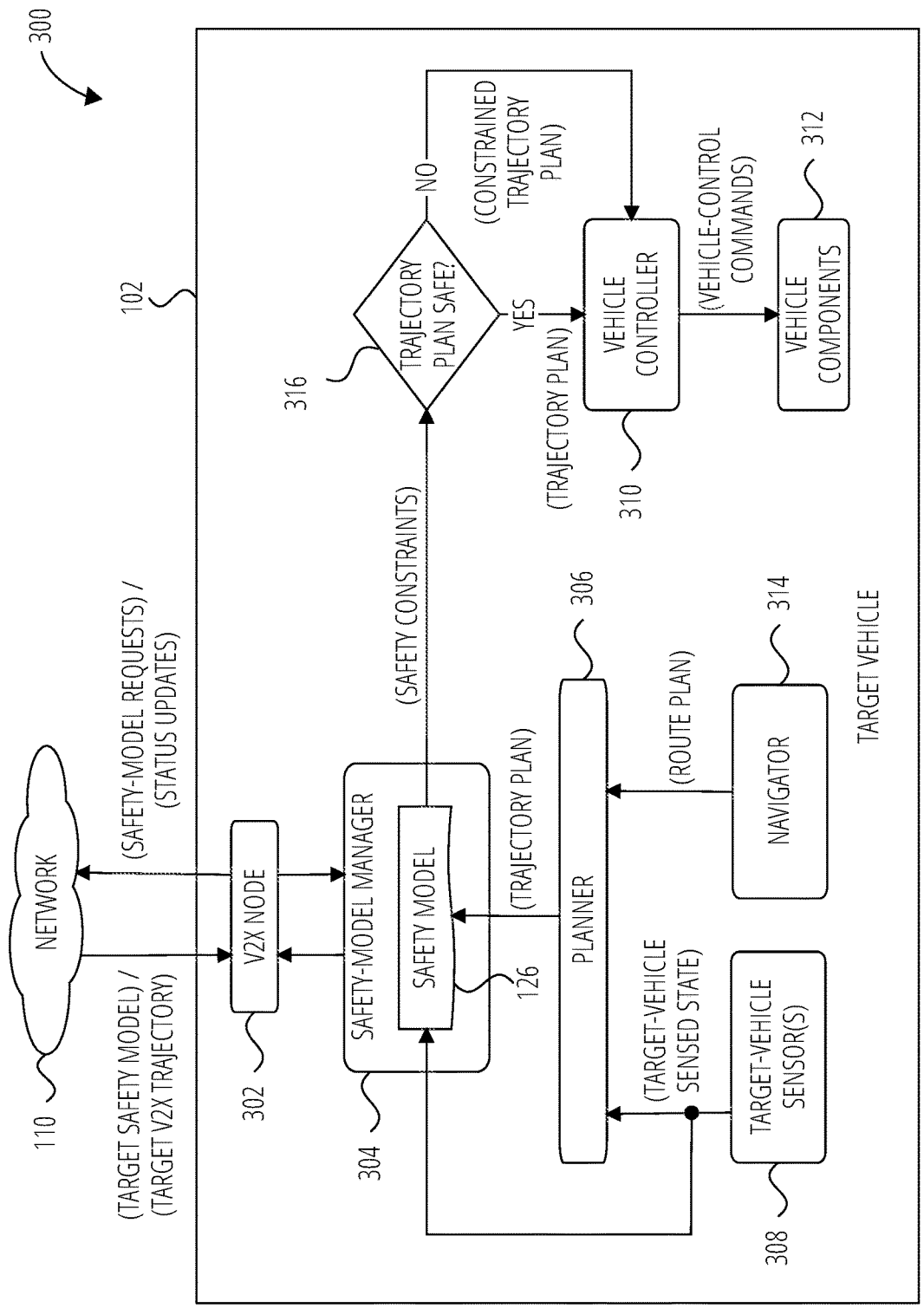
FIG. 3 depicts an example target-vehicle architecture, in accordance with at least one embodiment.

FIG. 3 depicts an example target-vehicle architecture 300, in accordance with at least one embodiment. In particular, FIG. 3 depicts the example target-vehicle architecture 300 of the target vehicle 102 from FIG. 1. As shown in FIG. 3, the target-vehicle architecture 300 includes a V2X node 302 that exchanges data via the network 110, a safety-model manager 304, a planner 306, a target-vehicle sensor 308, a navigator 314, a trajectory-plan selector 316, a vehicle controller 310, and vehicle component 312.

The V2X node 302 may handle communications of the herein-described messaging between (i) the planner 306 of the target vehicle 102 and (ii) the network 110 (and therefore the safety-model service 108 and/or the edge node 112, and so forth). The planner 306 may receive sensor data regarding the state and environment of the target vehicle 102 from the target-vehicle sensor 308, and may also receive route-planning data from the navigator 314. As shown, the sensed state of the target vehicle 102 may also be transmitted to the safety model 126, which is being executed by the safety-model manager 304. The planner 306 processes the sensor data together with the route-plan data in order to generate a trajectory plan, which the planner 306 provides to the safety model 126. The trajectory plan may include near-term instructions, rules, or criteria for vehicle acceleration, braking, turning, and/or the like, and associated control of the subsystems which accomplish such acceleration, braking, turning, etc.

The safety model 126 may process the trajectory plan and generate one or more safety constraints, which the safety model 126 may provide to the trajectory-plan selector 316. The trajectory-plan selector 316 then makes a determination (using, e.g., an aggregate safety metric as compared with a threshold) as to whether or not the trajectory plan is safe. If the determination is that the trajectory plan is safe, the trajectory plan is provided to the vehicle controller 310. If the determination instead is that the trajectory plan is not safe, a constrained trajectory plan is provided to the vehicle controller 310. The constrained trajectory plan would be constrained in some way (e.g., speed) based on the safety constraints generated by the safety model 126. Regardless of which trajectory plan is provided to the vehicle controller 310, the vehicle controller 310 then issues one or more vehicle-control commands to the vehicle component 312 in order to cause the vehicle to take the trajectory plan. The vehicle component 312 in this example includes components such as steering mechanisms, braking mechanisms, acceleration mechanisms, and the like.

Figure 4:
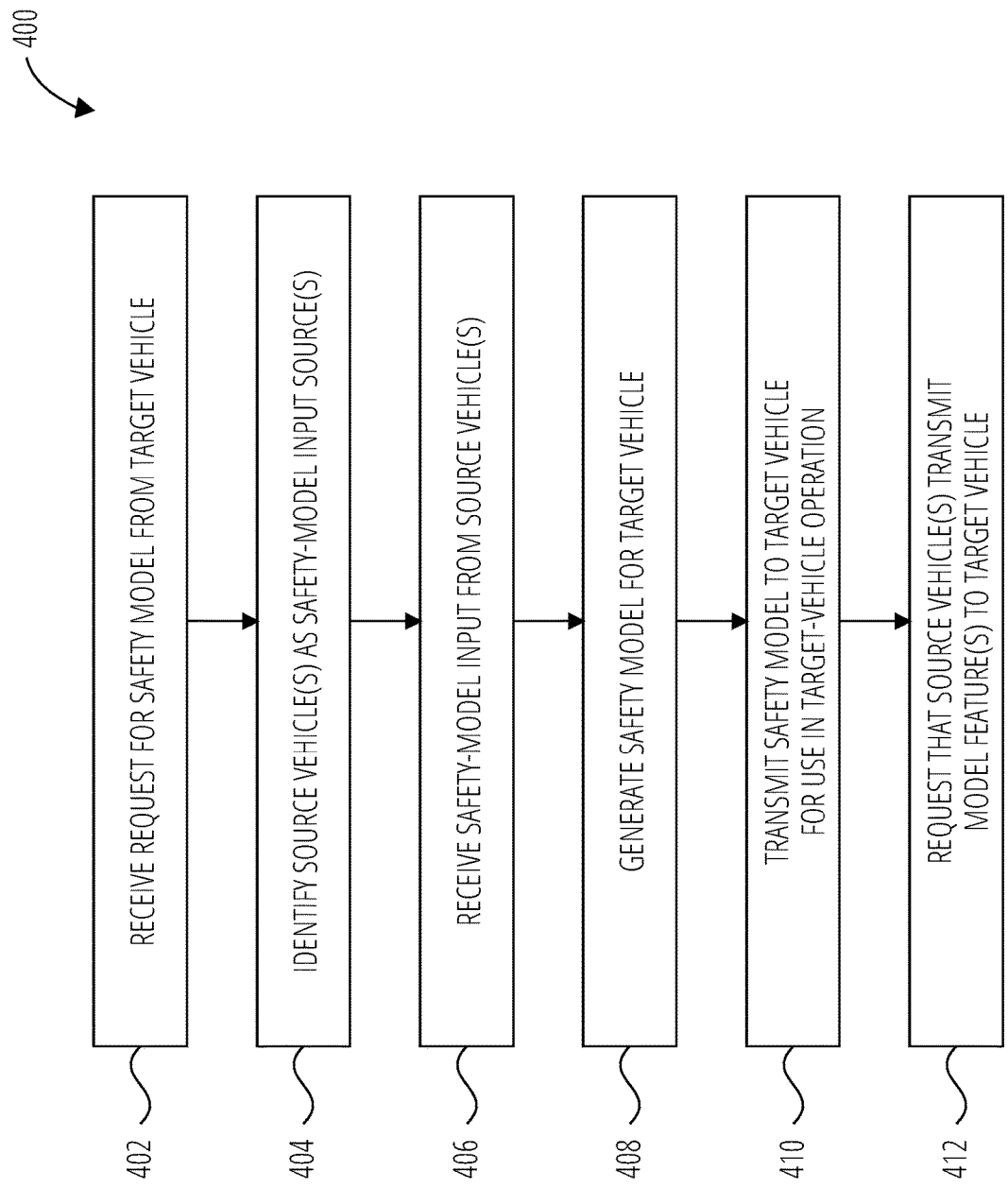
FIG. 4 depicts a first example method, in accordance with at least one embodiment.

FIG. 4 depicts an example method 400, in accordance with at least one embodiment. The method 400 may be performed by the safety-model service 108 the safety-model service 206 of the edge node 112, and/or the like. In this description of FIG. 4, the method 400 is described by way of example as being performed by the safety-model service 108 and an accompanying computing server, node, or platform. The various operations of the method 400 are more fully described throughout the present disclosure.

At operation 402, the safety-model service 108 receives a safety-model request for a safety model from the target vehicle 102. At operation 404, the safety-model service 108 identifies, responsive to receiving the safety-model request at operation 402, source vehicles as safety-model input sources. At operation 406, the safety-model service 108 receives safety-model input from the identified one or more source vehicles 116, 120, 122, and 124. In this example, the safety-model service 108 does not select the source vehicle 118, which may have capabilities quite similar to or even less than that of the target vehicle 102. At operation 408, the safety-model service 108 generates, based on the safety-model request and the received safety-model input, the target-vehicle safety model 126 for the target vehicle 102. At operation 410, the safety-model service 108 transmits the target-vehicle safety model 126 to the target vehicle 102 for use by the target vehicle 102 in operation. In an embodiment, the safety-model service 108 instructs the identified source vehicles 116, 120, 122, and 124 to transmit model-feature data to the target vehicle 102 for processing by the target-vehicle safety model 126.

Figure 5:
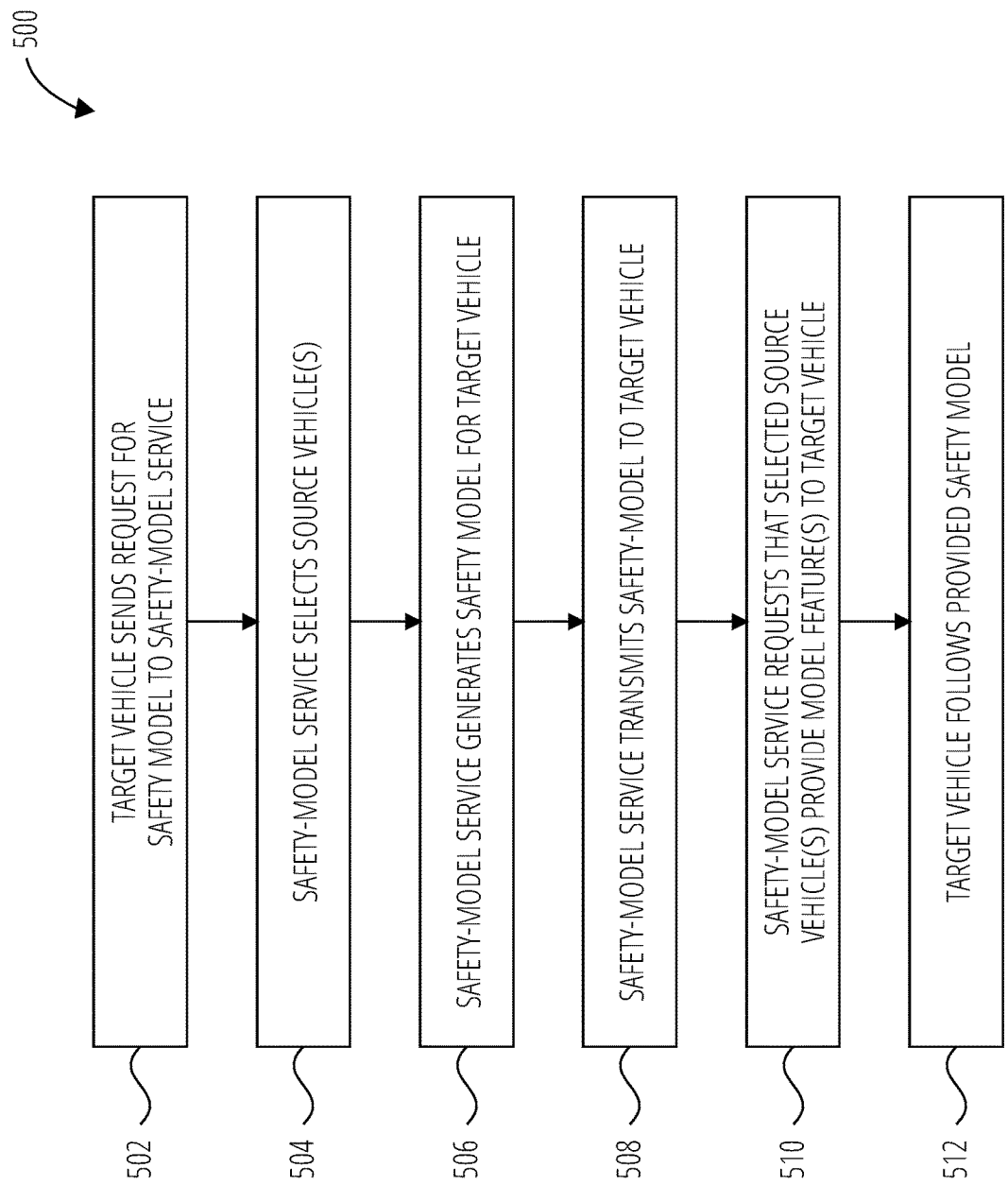
FIG. 5 depicts a second example method, in accordance with at least one embodiment.

FIG. 5 depicts an example method 500, in accordance with at least one embodiment. The method 500 is described by way of example as being carried out by a combination of the target vehicle 102 and the safety-model service 108. The method 500 is described by way of example in connection with a requested safety model pertaining to a lane-change maneuver.

At operation 502, the target vehicle 102 sends a request for a safety model to the safety-model service 108. This operation could just as well be phrased that the safety-model service 108 receives such a request from the target vehicle 102. In this example, the target vehicle 102 may already have a safety model, and may be requesting a refining of that safety model for lane changing. In embodiments, in the safety-model request, the target vehicle 102 can indicate requirements (or preferences) used to select the source vehicles (e.g., reputation ranking, capabilities, past experience, matching driving behavior, and/or the like). At operation 504, the safety-model service 108 selects source vehicles 116, 120, 122, and 124, in some instances taking into account one or more of those requested factors.

At operation 506, the safety-model service 108 generates the safety model 126 for the target vehicle 102. When constructing a model, the safety-model service 108 may use one or more feature-selection techniques and/or one or more feature-reduction techniques related to machine learning, deep learning, and/or the like. Examples include filter methods (e.g., Pearson's Correlation, linear discriminant analysis (LDA), analysis of variance (anova), Chi-square), wrapper methods, embedded methods, PCA, and/or the like. At operation 508, the safety-model service 108 transmits safety-model to target vehicle.

At operation 510, the safety-model service 108 requests that the selected source vehicles 116, 120, 122, 124 provide model-feature inputs to the target vehicle 102. Thus, once selected, a given source vehicle can supply the requested inputs from, e.g., its available sensors. Thus, dynamic inputs will continue to be supplied to the target vehicle 102 so that the safety model 126 can properly be executed. In at least one embodiment, one or more feature inputs may be reflective of driving behavior, improving safety and making the trained safety-model instance more specific and personalized to the driver. Moreover, in at least one embodiment, one or more source vehicles provide one or more on-board diagnostics (OBD) port values for calibration and/or as model features. These could be Controller Area Network (CAN) values, Local Interconnection Network (LIN) values, and/or the like. This calibration may assist with potential deterioration over time of sensor performance. Moreover, differences among drivers with the same or different operating instances of a given sensor model may be accounted for with such calibration data.

At operation 512, the target vehicle 102 follows the provided safety model 126. In some embodiments, a lane-changing event that should not be conducted because a car is in the other lane may be detected and an alert (e.g., a honked horn) may be instructed to be issued by the other car. In general, then, the target vehicle 102 can then apply the received safety model 126 during the trip and use this information to make safe decisions. After a relevant time period for a given use case has passed, a given safety model could be terminated manually by a user, automatically by the system, and/or in one or more other ways.

Figure 6:
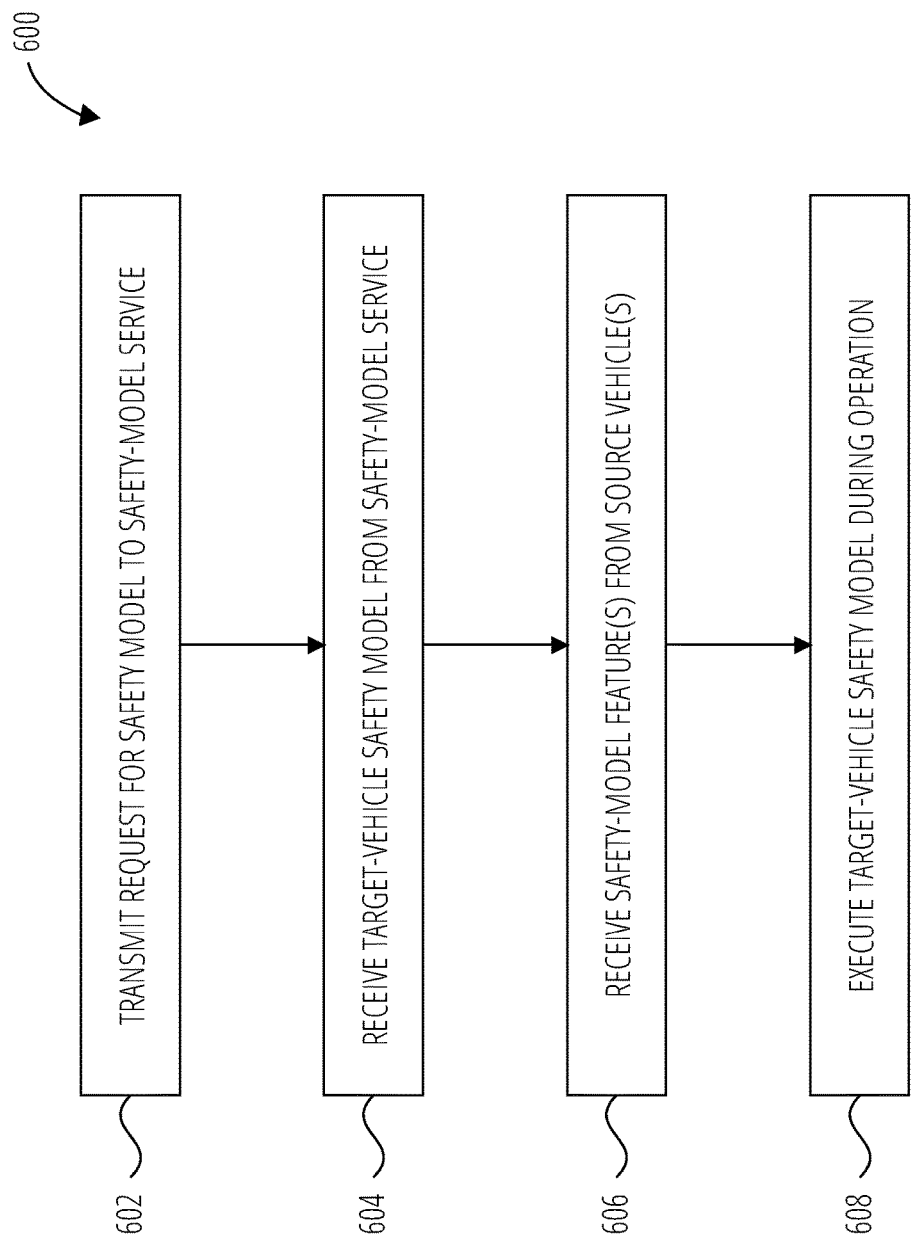
FIG. 6 depicts a third example method, in accordance with at least one embodiment.

FIG. 6 depicts an example method 600, in accordance with at least one embodiment. By way of example, the method 600 is described by way of example as being performed by the target vehicle 102. Many of the aspects of the method 600 are discussed elsewhere in the present disclosure, and therefore are not redundantly described here. At operation 602, the target vehicle 102 transmits a request for a safety model to the safety-model service 108. At operation 604, the target vehicle 102 receives the target-vehicle safety model 126 from the safety-model service 108.

At operation 606, the target vehicle 102 receives safety-model-feature input data from one or more source vehicles selected by the safety-model service 108. In at least one embodiment, the safety-model service 108 can also save feature sets for specific target vehicles, drivers, and/or the like. Moreover, when requested, the safety-model service 108 may supply the saved feature sets to the target vehicle 102 after modification as suitable for the target vehicle 102. Indeed, vehicle model features are typically declared (e.g., published) by manufacturers, which facilitates the collection, saving, and use-case-based selection of model features on request from a given target vehicle. In some instances, the safety-model service may supply prebuilt use-case-specific features which, together with driver-behavior-specific feature sets among other example data, can be used to generated safety-model instances that are tailored to a given vehicle type, a given driver, a given rider, and/or the like. At operation 608, the target vehicle 102 executes the target-vehicle safety model 126 during operation.

Figure 7:
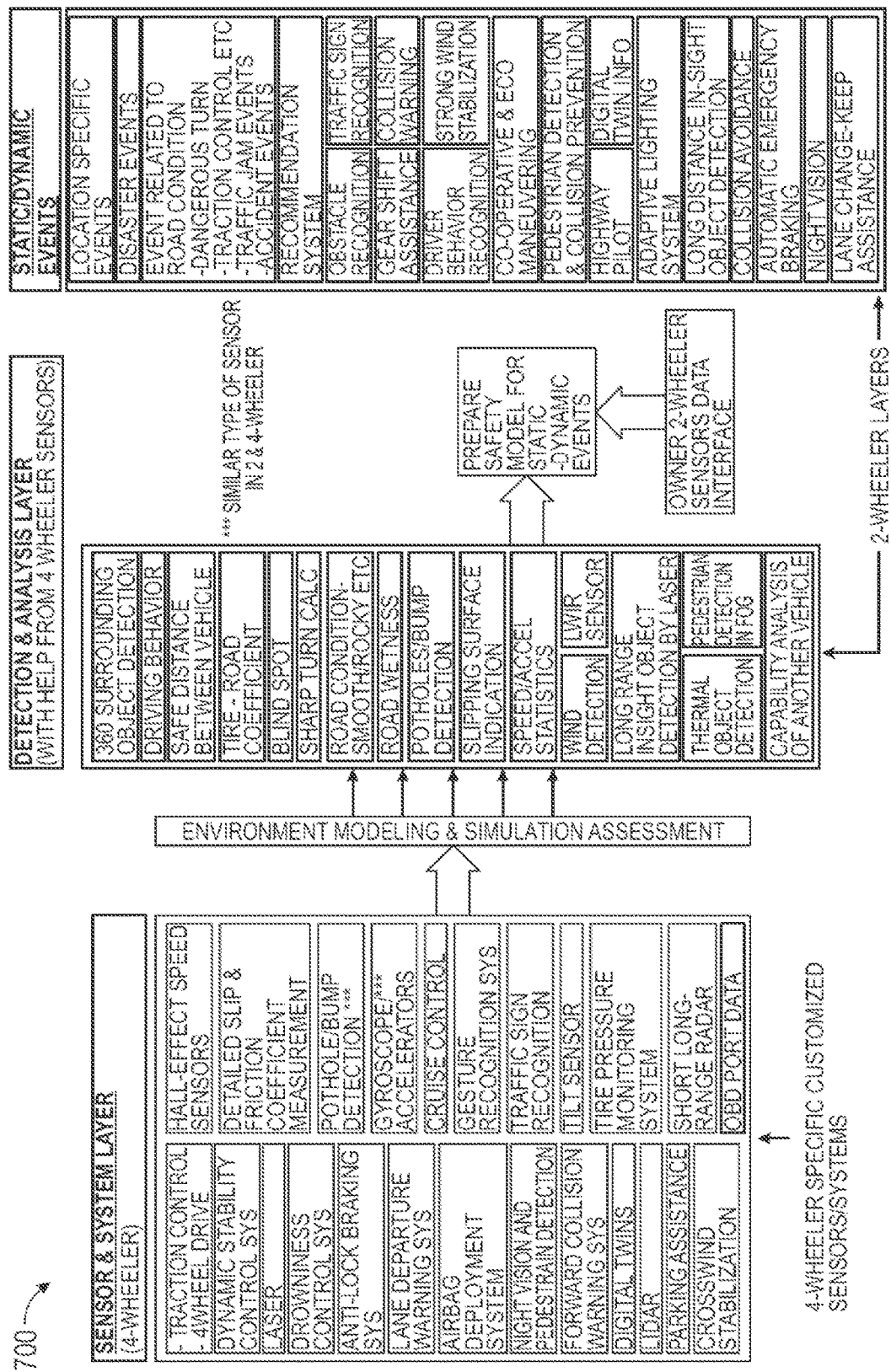
FIG. 7 depicts an example four-wheel-to-two-wheel-transform diagram, in accordance with at least one embodiment.
Figure 8:
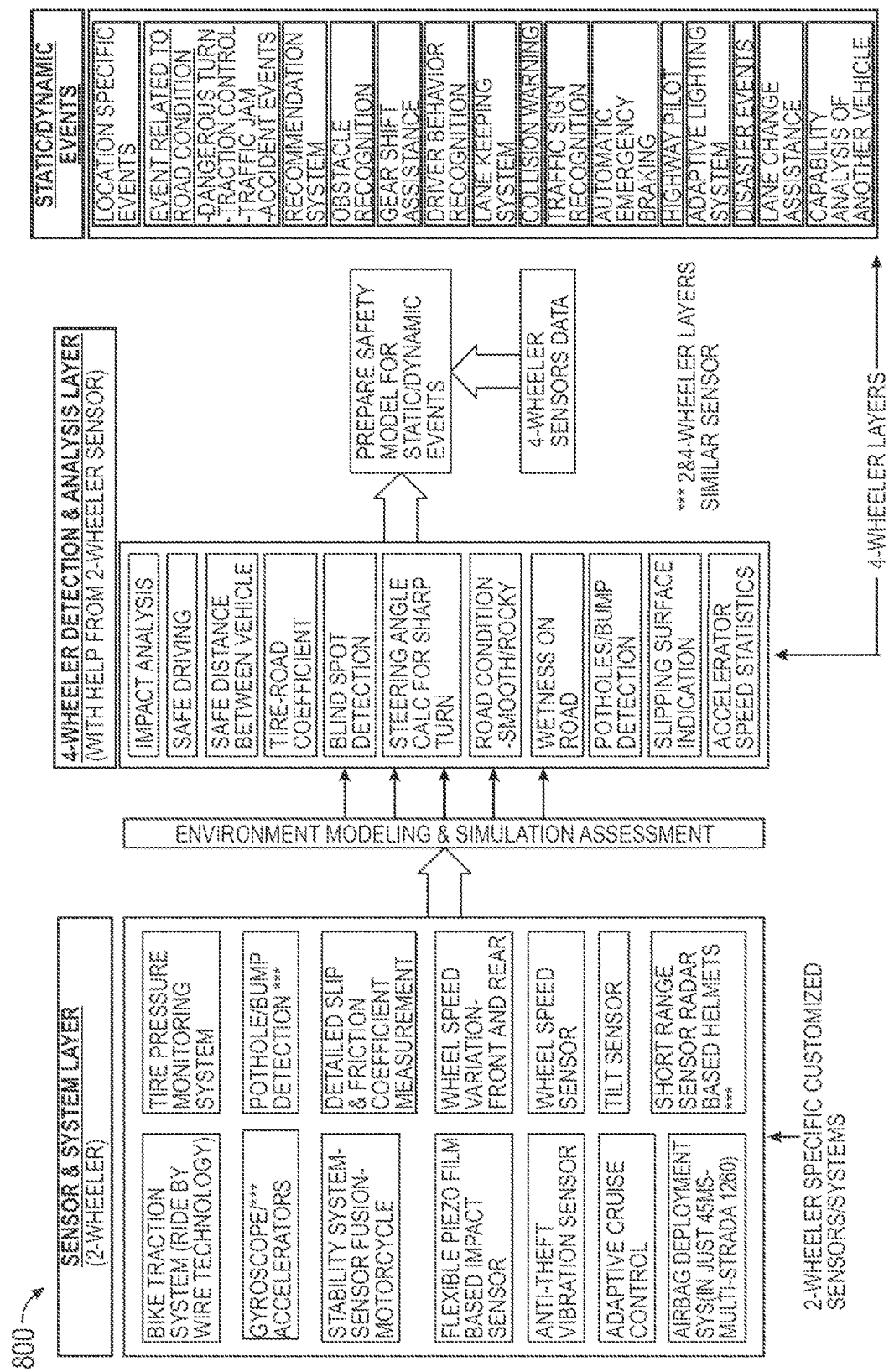
FIG. 8 depicts an example two-wheel-to-four-wheel-transform diagram, in accordance with at least one embodiment.

FIG. 7 depicts an example four-wheel-to-two-wheel-transform diagram 700, in accordance with at least one embodiment. Both FIG. 7 and FIG. 8 provide examples of model transformations that are conducted in accordance with embodiments of the present disclosure. The example four-wheel-to-two-wheel-transform diagram 700 of FIG. 7 shows an example in which a 4-wheeled vehicle (e.g., a luxury sedan) is being used as a source vehicle for a safety model for a 2-wheeled (e.g., motorcycle) target vehicle 102. On the left, an example set of sensors and systems on the source vehicle are shown. Three of those, as indicated by the "*" as shown in the legend, are identified here as having a similar analog in a set of sensors and systems on the target vehicle. An example set of static and dynamic events pertaining to the target vehicle 102** are shown on the right. The two identified sensors are "pothole/bump detection" and "gyroscope/accelerators," both of which would be relevant to a motorcycle. Moreover, it is noted that the sensors that are described herein as being available on a given 2-wheeler, 3-wheeler, 4-wheeler, and/or the like are provided only as examples and should not be interpreted as limiting. Furthermore, the few examples that are offered in the present disclosure as being sensors available on and/or applicable to more than one type of vehicle are intended to be illustrative as well, as different and/or a greater amount of crossover sensors could be present in any given implementation.

The layers of the 4-wheeler are depicted as being processed through an environmental modeling and simulation layer of the target 2-wheeler. A safety model is generated based on the detection and analysis layers of the 2-wheeler, with the enhanced assistance of the data from the 4-wheeler in connection with "pothole/bump detection" and "gyroscope/accelerators." In an embodiment, data is gathered using the four-wheeler sensors and transformed for creating the two-wheeler's safety model. The four-wheeler may provide various available inputs to the safety-model service 108, which may then review the applicability of the various items of information therein. Inapplicable input may be discarded, and the rest may be passed to a transformation layer for further processing before the safety model 126 is built for the target vehicle 102.

FIG. 8 depicts an example two-wheel-to-four-wheel-transform diagram 800, in accordance with at least one embodiment. The two-wheel-to-four-wheel-transform diagram 800 of FIG. 8 is similar in structure to the four-wheel-to-two-wheel-transform diagram 700 of FIG. 7, and thus is not described in as great of detail. FIG. 8 essentially shows a converse process to that shown in FIG. 7. That is, in the two-wheel-to-four-wheel-transform diagram 800 of FIG. 8, it is a 2-wheel source vehicle and a 4-wheel target vehicle. As shown, in this example, the three sensors of the 2-wheeler deemed similar enough to those on the 4-wheeler to be useful for modeling are "gyroscope/accelerators" (again), "pothole/bump detection" (again), and "short range sensor radar based helmets." Thus, simpler vehicles can be used as source vehicles for more complex target vehicles.

The following scenario may occur in an example in which a user is planning a trip and elects to use a safety-model service in accordance with an embodiment in advance to assist in the planning process. This scenario involves processing related to a static safety model, and will be understood as a non-limiting example of the presently disclosed approaches.

The user may log into a safety-model service, share its trip and vehicle-capability details, and ask for relevant safety models for location-specific events and routes as applicable to the target vehicle.

The safety-model service may provide available static safety models, as applicable to the route and considering the target vehicle kinematic model capability. The safety model service may validate a static model with given vehicle capabilities by running (e.g., simulating) the route events and verifying safety metrics. Other capable devices (mobile devices, infrastructure devices, and/or the like) may also process, prepare, and/or retune safety models and share with the target vehicle as requested.

The target vehicle may receive static model and incorporate safety model with planned route map before starting its journey. The safety model service and/or the target vehicle may accept safety-model privileges and configure user-interface alerts.

If needed, the user may input all static safety models to the target vehicle and begin the trip.

The target vehicle may detect a listed event location, and determine whether a static safety model is available and applicable to that event location. If not, the target vehicle may continue operation as before. If so, the target vehicle may follow the identified static safety model.

In some cases, target vehicles may be provided with prediction-accuracy metrics for categories such as safe, unsafe, moderately safe, and/or the like, along with recommendations to increase prediction accuracy.

A given safety model could be stopped in any of a number of different ways. Some examples include being manually stopped by the user, being automatically stopped by the vehicle, and/or being stopped by way of notification issued by the safety-model service.

Furthermore, the following may occur in an example in which a user is has started a trip. The following operations may occur in connection with processing of a dynamic safety model.

The user may login to a network (e.g., an edge computing or cloud computing network) and access an entity (e.g., a safety-model service), share the endpoints of its route (e.g., origin and destination, current location and destination, and/or the like), share its vehicle-capability details, request creation of a dynamic safety model for dynamic events along the planned route.

The safety-model service may send a safety model to the target vehicle, and the safety-model service may also identify one or more features, sensors, and/or the like not available on the target vehicle, and may query one or more surrounding capable vehicles to supply that information.

The target vehicle may schedule reception of inputs from the safety-model service.

The safety-model service may receive one or more inputs from one or more (e.g., preauthorized and/or pre-authenticated) capable source vehicles. The safety-model service may also perform sensor fusion, retuning, and/or the like, in order to create smart inputs for providing to the target vehicle.

The safety-model service may evaluate whether the inputs that it has prepared for sending to the target vehicle are acceptable with respect to thresholds relating to metrics such as safety and accuracy. If not, the safety-model service may perform retuning, which may involve checking recommendations regarding ways to improve safety, accuracy, and/or the like.

If the inputs from the safety-model service are acceptable with respect to thresholds relating to metrics such as safety and accuracy, the safety-model service may then send the developed safety model to the target vehicle, which may then operate with the provided safety model executing.

The safety-model service may continue to identify one or more features, sensors, and/or the like not available on the target vehicle, and may query one or more surrounding capable vehicles to supply that information.

As stated above, a given safety model could be stopped in any of a number of different ways. Some examples include being manually stopped by the user, being automatically stopped by the vehicle, by timing out, and/or being stopped by way of notification issued by the safety-model service.

Various embodiments described herein relate to different messaging and processing flows for target vehicles to request safety models (and/or to have safety models requested on their behalf via, e.g., a mobile device). In various different embodiments, processing is performed to create one or more safety models for processing of static and/or dynamic events to be used by a requesting vehicle (target vehicle) during a particular road trip. When (or before) a given user starts a given journey, their target vehicle may query a safety-model service, which may in turn distribute the request to one or more cloud/edge components. The safety-model service may make use of a safety-model database as well as one or more deployed edge devices to collect previous applicable safety models useful for the target vehicle and current event information for a given route, and use this collected information to generate one or more safety models for the route planned by the target vehicle. Any given safety model could be relevant to all or to some of a given journey.

If a given target vehicle does not have external connectivity, a user may collect and/or query static-safety-model data using a mobile device, and may then use that data to create a safety model for the target vehicle based on particular characteristics of the target vehicle such as kinematic capabilities, dimensions, sensors, and/or the like. The user may then load the constructed safety model manually on to the target vehicle. In such cases, where the target vehicle does not have external connectivity, the information available during a trip may be limited to the information that is gathered prior to starting the journey, as well as updates that can occur in some instances along the way via the mobile device, from which such updates could then be uploaded to the vehicle. In some embodiments, communication between mobile device and target vehicle is conducted over a Bluetooth connection between the mobile device and a dongle that is communicatively connected to the OBD of the target vehicle.

A given target vehicle can, in some embodiments, utilize its own previously used models and feature set. Moreover, it can utilize its own sensors, and it can gather data from external infrastructure and/or from other vehicles. In some embodiments, a principal component analysis (PCA) is used for a feature set and subsequently for computing principal components, in order to improve prediction accuracy. As is known in the art, PCA is a dimensionality-reduction method that is often used to reduce the dimensionality of large data sets, by transforming a large set of variables into a smaller one that still contains most of the information in the large set by trading off a little accuracy. As feature-set size is reduced, it can significantly save bandwidth required for transmission of feature sets.

When a given target vehicle starts a given journey, the target vehicle may also seek to discover and/or query well-equipped capable vehicles going along to the same destination or along at least part of the same route for various driving safety requirements. Simultaneously, a more well-equipped vehicle may use its own resources, and may also use available infrastructure cooperatively to create use-case-driven contextual safety models for other (target) vehicles. In so doing, the more well-equipped vehicle may take into account a given target vehicle's capabilities, driving pattern, and/or other observable and/or disclosed parameters. In some embodiments, a well-equipped vehicle may communicate a created model to Infrastructure using V2I or to the target vehicle using V2V. In some instances, a given infrastructure element (e.g., traffic light, roadside unit, dedicated device, and so on) stores such provided models and communicates them using other protocols to other interested target vehicles as well.

Furthermore, in at least one embodiment, a given target vehicle can contact one or more other vehicles, one or more infrastructure elements, and/or the like to request creation and/or tuning (e.g., retuning) of temporary safety models. Based on a number of different factors (e.g., make, model, kinetic capabilities, sensor set, sensor configuration, and/or the like), driver ratings may be provided by various different entities such as insurance companies, for example. Moreover, further data related to driving tendencies, behaviors, and so forth can be gained from driver profiles, traffic-violation records, and/or the like. Of course, in a great many cases, such data is appropriately protected by privacy measures, and would likely need to be shared by the given users on an opt-in basis. Based on one or more of these and/or other factors, a safety model (e.g., a best-matching safety model) may be selected for provision to a given target vehicle. In some instances, one or more safety models may be selected by a driver of a target vehicle.

Moreover, in some embodiments, multiple different safety models are simultaneously executed by a given target vehicle. In an example, a first executing safety model may automatically or request that the user activate the bright headlights going into a blind turn a particular coordinates in difficult weather conditions, whereas a second executing safety model may perform calculations for safe navigation (e.g., safe lean) on the upcoming curve. And certainly numerous other examples could be listed here as well. In various different embodiments, independently (or interdependently) executing safety models on a given vehicle may share one or more inputs, one or more feeds from one or more sensors, and/or the like. Each safety model may transform received data as needed and as appropriate for use by that executing safety model.

Figure 9:
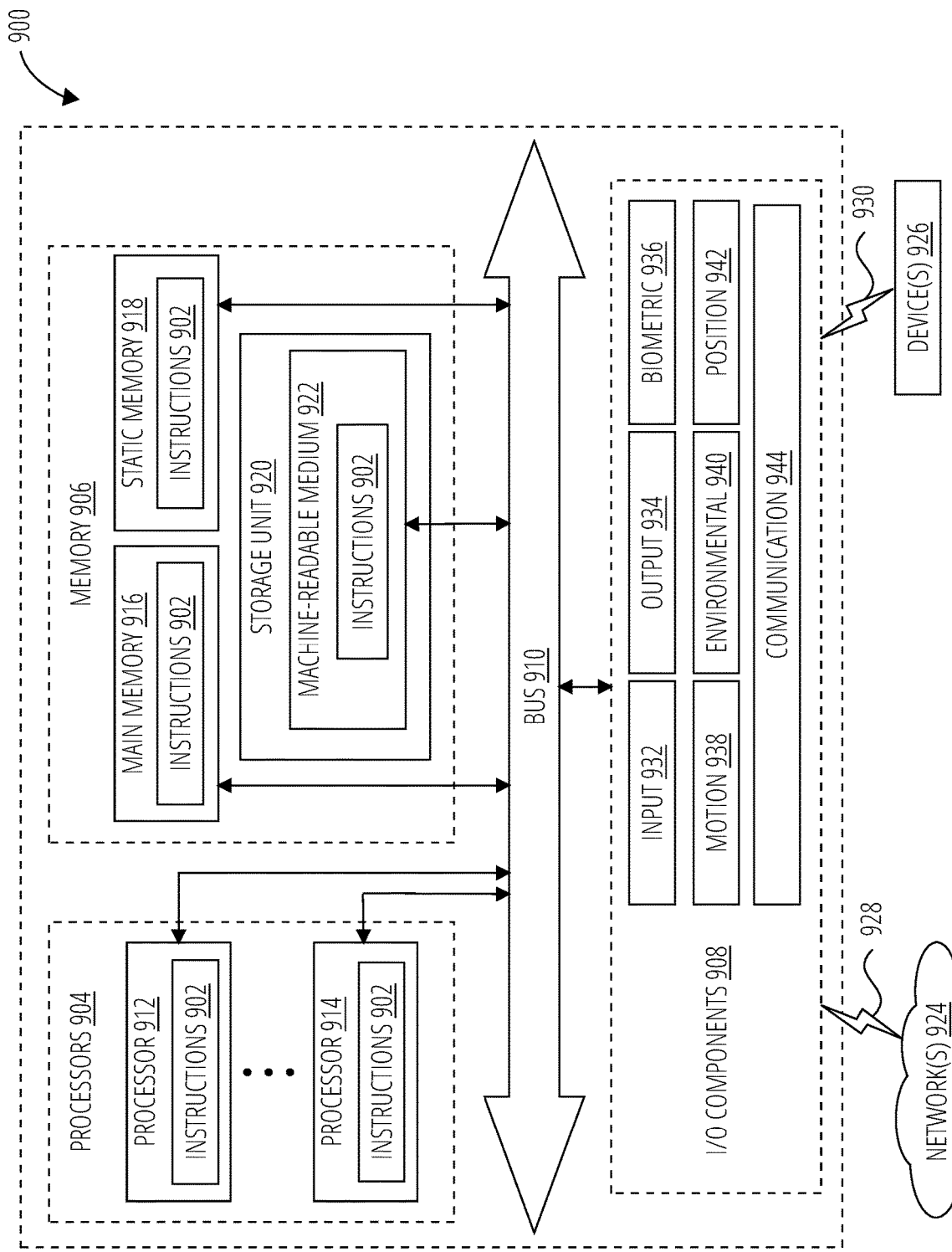
FIG. 9 depicts an example computer system, in accordance with at least one embodiment.

FIG. 9 depicts an example computer system 900 within which instructions 902 (e.g., software, firmware, a program, an application, an applet, an app, a script, a macro, and/or other executable code) for causing the computer system 900 to perform any one or more of the methodologies discussed herein may be executed. In at least one embodiment, execution of the instructions 902 causes the computer system 900 to perform one or more of the methods described herein. In at least one embodiment, the instructions 902 transform a general, non-programmed computer system into a particular computer system 900 programmed to carry out the described and illustrated functions. The computer system 900 may operate as a standalone device or may be coupled (e.g., networked) to and/or with one or more other devices, machines, systems, and/or the like. In a networked deployment, the computer system 900 may operate in the capacity of a server and/or a client in one or more server-client relationships, and/or as one or more peers in a peer-to-peer (or distributed) network environment.

The computer system 900 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 902, sequentially or otherwise, that specify actions to be taken by the computer system 900. And while only a single computer system 900 is illustrated, there could just as well be a collection of computer systems that individually or jointly execute the instructions 902 to perform any one or more of the methodologies discussed herein.

As depicted in FIG. 9, the computer system 900 may include processors 904, memory 906, and I/O components 908, which may be configured to communicate with each other via a bus 910. In an example embodiment, the processors 904 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 912 and a processor 914 that execute the instructions 902. The term "processor" is intended to include multi-core processors that may include two or more independent processors (sometimes referred to as "cores") that may execute instructions contemporaneously. Although FIG. 9 shows multiple processors 904, the computer system 900 may include a single processor with a single core, a single processor with multiple cores (e.g., a multi-core processor), multiple processors with a single core, multiple processors with multiples cores, or any combination thereof.

The memory 906, as depicted in FIG. 9, includes a main memory 916, a static memory 918, and a storage unit 920, each of which is accessible to the processors 904 via the bus 910. The memory 906, the static memory 918, and/or the storage unit 920 may store the instructions 902 executable for performing any one or more of the methodologies or functions described herein. The instructions 902 may also or instead reside completely or partially within the main memory 916, within the static memory 918, within machine-readable medium 922 within the storage unit 920, within at least one of the processors 904 (e.g., within a cache memory of a given one of the processors 904), and/or any suitable combination thereof, during execution thereof by the computer system 900. In at least one embodiment, the machine-readable medium 922 includes one or more non-transitory computer-readable storage media.

Furthermore, also as depicted in FIG. 9, I/O components 908 may include a wide variety of components to receive input, produce and/or provide output, transmit information, exchange information, capture measurements, and/or the like. The specific I/O components 908 that are included in a particular instance of the computer system 900 will depend on the type of machine. For example, portable machines such as mobile phones may include a touch input device or other such input mechanisms, while a headless server machine may not include such a touch input device. Moreover, the I/O components 908 may include many other components that are not shown in FIG. 9.

In various example embodiments, the I/O components 908 may include input components 932 and output components 934. The input components 932 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 934 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 908 may include, as examples, biometric components 936, motion components 938, environmental components 940, and/or position components 942, among a wide array of possible components. As examples, the biometric components 936 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 938 may include acceleration-sensing components (e.g., an accelerometer), gravitation-sensing components, rotation-sensing components (e.g., a gyroscope), and/or the like.

The environmental components 940 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 942 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 908 may further include communication components 944 operable to communicatively couple the computer system 900 to one or more networks 924 and/or one or more devices 926 via a coupling 928 and/or a coupling 930, respectively. For example, the communication components 944 may include a network-interface component or another suitable device to interface with a given network 924. In further examples, the communication components 944 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 926 may include one or more other machines and/or any of a wide variety of peripheral devices (e.g., a peripheral device coupled via a universal serial bus (USB) connection).

Moreover, the communication components 944 may detect identifiers or include components operable to detect identifiers. For example, the communication components 944 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 944, such as location via IP geolocation, location via Wi-Fi signal triangulation, location via detecting an NFC beacon signal that may indicate a particular location, and/or the like.

One or more of the various memories (e.g., the memory 906, the main memory 916, the static memory 918, and/or the (e.g., cache) memory of one or more of the processors 904) and/or the storage unit 920 may store one or more sets of instructions (e.g., software) and/or data structures embodying or used by any one or more of the methodologies or functions described herein. These instructions (e.g., the instructions 902), when executed by one or more of the processors 904, cause performance of various operations to implement various embodiments of the present disclosure.

The instructions 902 may be transmitted or received over one or more networks 924 using a transmission medium, via a network-interface device (e.g., a network-interface component included in the communication components 944), and using any one of a number of transfer protocols (e.g., the Session Initiation Protocol (SIP), the HyperText Transfer Protocol (HTTP), and/or the like). Similarly, the instructions 902 may be transmitted or received using a transmission medium via the coupling 930 (e.g., a peer-to-peer coupling) to one or more devices 926. In some embodiments, IoT devices can communicate using Message Queuing Telemetry Transport (MQTT) messaging, which can be relatively more compact and efficient.

In view of the disclosure above, a listing of various examples of embodiments is set forth below. It should be noted that one or more features of an example, taken in isolation or combination, should be considered to be within the disclosure of this application.

Example 1 is a system that includes: at least one hardware processor; and at least one memory storing instructions that, when executed by the at least one hardware processor, cause the at least one hardware processor to perform operations to: receive a safety-model request for a safety model from a target vehicle; identify, responsive to receiving the safety-model request, one or more source vehicles as safety-model input sources; receive safety-model data associated with the identified one or more source vehicles; generate, based on the safety-model request and the received safety-model data, a target-vehicle safety model for the target vehicle; and transmit the target-vehicle safety model to the target vehicle for use by the target vehicle.

Example 2 is the system of Example 1, where the safety-model request includes target-vehicle-profile data that indicates one or more of a size of the target vehicle, kinematic capabilities of the target vehicle, and onboard-system configuration of the target vehicle.

Example 3 is the system of Example 2, where the identified one or more source vehicles includes one or more of: one or more source vehicles having a different size than the target vehicle; one or more source vehicles having different kinematic capabilities than the target vehicle; and one or more source vehicles having a different onboard-system configuration than the target vehicle.

Example 4 is the system of any of the Examples 1-3, where identifying the one or more source vehicles as safety-model input sources includes identifying that one or more source vehicles are in a vicinity of a current or expected location of the target vehicle.

Example 5 is the system of any of the Examples 1-4, where generating the target-vehicle safety model for the target vehicle based on the safety-model request and the received safety-model data includes transforming data received from at least one identified source vehicle based on identified differences between the at least one identified source vehicle and the target vehicle.

Example 6 is the system of any of the Examples 1-5, the operations further including revising the target-vehicle safety model in response to receiving a model-revision request from the target vehicle.

Example 7 is the system of any of the Examples 1-6, where the target-vehicle safety model provides a plurality of safety rules or criteria used to control operations in one or more subsystems of the target vehicle.

Example 8 is the system of any of the Examples 1-7, the operations further comprising instructing the one or more identified source vehicles to transmit model-feature data to the target vehicle for processing by the target-vehicle safety model.

Example 9 is at least one non-transitory computer-readable storage medium containing instructions that, when executed by at least one hardware processor of a computer system, cause the at least one hardware processor to perform operations to: receive a safety-model request for a safety model from a target vehicle; identify, responsive to receiving the safety-model request, one or more source vehicles as safety-model input sources; receive safety-model data associated with the identified one or more source vehicles; generate, based on the safety-model request and the received safety-model data, a target-vehicle safety model for the target vehicle; and transmit the target-vehicle safety model to the target vehicle for use by the target vehicle.

Example 10 is the at least one non-transitory computer-readable storage medium of Example 9, where the safety-model request includes target-vehicle-profile data that indicates one or more of a size of the target vehicle, kinematic capabilities of the target vehicle, and onboard-system configuration of the target vehicle.

Example 11 is the at least one non-transitory computer-readable storage medium of Example 10, where the identified one or more source vehicles includes one or more of: one or more source vehicles having a different size than the target vehicle; one or more source vehicles having different kinematic capabilities than the target vehicle; and one or more source vehicles having a different onboard-system configuration than the target vehicle.

Example 12 is the at least one non-transitory computer-readable storage medium of any of the Examples 9-11, where identifying the one or more source vehicles as safety-model input sources includes identifying that one or more source vehicles are in a vicinity of a current or expected location of the target vehicle.

Example 13 is the at least one non-transitory computer-readable storage medium of any of the Examples 9-12, where generating the target-vehicle safety model for the target vehicle based on the safety-model request and the received safety-model data includes transforming data received from at least one identified source vehicle based on identified differences between the at least one identified source vehicle and the target vehicle.

Example 14 is the at least one non-transitory computer-readable storage medium of any of the Examples 9-13, the operations further including revising the target-vehicle safety model in response to receiving a model-revision request from the target vehicle.

Example 15 is the at least one non-transitory computer-readable storage medium of any of the Examples 9-14, where the target-vehicle safety model provides a plurality of safety rules or criteria used to control operations in one or more subsystems of the target vehicle.

Example 16 is the at least one non-transitory computer-readable storage medium of any of the Examples 9-15, the operations further comprising instructing the one or more identified source vehicles to transmit model-feature data to the target vehicle for processing by the target-vehicle safety model.

Example 17 is an apparatus that includes: means for receiving a safety-model request for a safety model from a target vehicle; means for identifying, responsive to receiving the safety-model request, one or more source vehicles as safety-model input sources; means for receiving safety-model data associated with the identified one or more source vehicles; means for generating, based on the safety-model request and the received safety-model data, a target-vehicle safety model for the target vehicle; and means for transmitting the target-vehicle safety model to the target vehicle for use by the target vehicle, the one or more identified source vehicles being configured to transmit model-feature data to the target vehicle for processing by the target-vehicle safety model.

Example 18 is the apparatus of Example 17, further including means for obtaining, from the safety-model request, target-vehicle-profile data that indicates one or more of a size of the target vehicle, kinematic capabilities of the target vehicle, and onboard-system configuration of the target vehicle.

Example 19 is the apparatus of Example 18, further including means for identifying the identified one or more source vehicles from one or more of: one or more source vehicles having a different size than the target vehicle; one or more source vehicles having different kinematic capabilities than the target vehicle; and one or more source vehicles having a different onboard-system configuration than the target vehicle.

Example 20 is the apparatus of any of the Examples 17-19, further including means for identifying that one or more source vehicles are in a vicinity of a current or expected location of the target vehicle.

Example 21 is the apparatus of any of the Examples 17-20, further including means for transforming data received from at least one identified source vehicle based on identified differences between the at least one identified source vehicle and the target vehicle.

Example 22 is the apparatus of any of the Examples 17-21, further including means for revising the target-vehicle safety model in response to receiving a model-revision request from the target vehicle.

Example 23 is the apparatus of any of the Examples 17-22, further including means for defining the target-vehicle safety model to provide a plurality of safety rules or criteria, the plurality of safety rules or criteria used to control operations in one or more subsystems of the target vehicle.

Example 24 is the apparatus of any of the Examples 17-23, further comprising means for instructing the one or more identified source vehicles to transmit model-feature data to the target vehicle for processing by the target-vehicle safety model.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be realized as a single component or be distributed across multiple components. In some cases, a module may be referred to as a unit.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:
1. A system comprising:
   at least one hardware processor; and at least one memory storing instructions that, when executed by the at least one hardware processor, cause the at least one hardware processor to perform operations to:
  receive a safety-model request for a safety model from a target vehicle;
  identify, responsive to receiving the safety-model request, one or more source vehicles as safety-model input sources;
  receive safety-model data associated with the identified one or more source vehicles;
  generate, based on the safety-model request and the received safety-model data, a target-vehicle safety model for the target vehicle, wherein the target-vehicle safety model comprises software instructions to be loaded onto the target vehicle to process sensor data of the target vehicle; and
  transmit the target-vehicle safety model to the target vehicle for use by the target vehicle, wherein the use of the target-vehicle safety model in the target vehicle controls operations of one or more subsystems of the target vehicle.

2. The system of claim 1, wherein the safety-model request comprises target-vehicle-profile data that indicates one or more of a size of the target vehicle, kinematic capabilities of the target vehicle, and onboard-system configuration of the target vehicle.

3. The system of claim 2, wherein the identified one or more source vehicles comprises one or more of:
  one or more source vehicles having a different size than the target vehicle;
  one or more source vehicles having different kinematic capabilities than the target vehicle; and
  one or more source vehicles having a different onboard-system configuration than the target vehicle.

4. The system of claim 1, wherein identifying the one or more source vehicles as safety-model input sources comprises identifying that one or more source vehicles are in a vicinity of a current or expected location of the target vehicle.

5. The system of claim 1, wherein generating the target-vehicle safety model for the target vehicle based on the safety-model request and the received safety-model data comprises transforming data received from at least one identified source vehicle based on identified differences between the at least one identified source vehicle and the target vehicle.

6. The system of claim 1, the operations further comprising revising the target-vehicle safety model in response to receiving a model-revision request from the target vehicle.

7. The system of claim 1, wherein the target-vehicle safety model provides a plurality of safety rules or criteria used to control the operations in the one or more subsystems of the target vehicle.

8. The system of claim 1, the operations further comprising instructing the one or more identified source vehicles to transmit model-feature data to the target vehicle for processing by the target-vehicle safety model.

9. At least one non-transitory computer-readable storage medium containing instructions that, when executed by at least one hardware processor of a computer system, cause the at least one hardware processor to perform operations to:
  receive a safety-model request for a safety model from a target vehicle;
  identify, responsive to receiving the safety-model request, one or more source vehicles as safety-model input sources;
  receive safety-model data associated with the identified one or more source vehicles;
  generate, based on the safety-model request and the received safety-model data, a target-vehicle safety model for the target vehicle, wherein the target-vehicle safety model comprises software instructions to be loaded onto the target vehicle to process sensor data of the target vehicle; and
  transmit the target-vehicle safety model to the target vehicle for use by the target vehicle, wherein the use of the target-vehicle safety model in the target vehicle controls operations of one or more subsystems of the target vehicle.

10. The at least one non-transitory computer-readable storage medium of claim 9, wherein the safety-model request comprises target-vehicle-profile data that indicates one or more of a size of the target vehicle, kinematic capabilities of the target vehicle, and onboard-system configuration of the target vehicle.

11. The at least one non-transitory computer-readable storage medium of claim 10, wherein the identified one or more source vehicles comprises one or more of:
  one or more source vehicles having a different size than the target vehicle;
  one or more source vehicles having different kinematic capabilities than the target vehicle; and
  one or more source vehicles having a different onboard-system configuration than the target vehicle.

12. The at least one non-transitory computer-readable storage medium of claim 9, wherein identifying the one or more source vehicles as safety-model input sources comprises identifying that one or more source vehicles are in a vicinity of a current or expected location of the target vehicle.

13. The at least one non-transitory computer-readable storage medium of claim 9, wherein generating the target-vehicle safety model for the target vehicle based on the safety-model request and the received safety-model data comprises transforming data received from at least one identified source vehicle based on identified differences between the at least one identified source vehicle and the target vehicle.

14. The at least one non-transitory computer-readable storage medium of claim 9, the operations further comprising revising the target-vehicle safety model in response to receiving a model-revision request from the target vehicle.

15. The at least one non-transitory computer-readable storage medium of claim 9, wherein the target-vehicle safety model provides a plurality of safety rules or criteria used to control the operations in the one or more subsystems of the target vehicle.

16. The at least one non-transitory computer-readable storage medium of claim 9, the operations further comprising instructing the one or more identified source vehicles to transmit model-feature data to the target vehicle for processing by the target-vehicle safety model.

17. An apparatus comprising:
  means for receiving a safety-model request for a safety model from a target vehicle;
  means for identifying, responsive to receiving the safety-model request, one or more source vehicles as safety-model input sources;
  means for receiving safety-model data associated with the identified one or more source vehicles;
  means for generating, based on the safety-model request and the received safety-model data, a target-vehicle safety model for the target vehicle, wherein the target-vehicle safety model comprises software instructions to be loaded onto the target vehicle to process sensor data of the target vehicle; and means for transmitting the target-vehicle safety model to the target vehicle for use by the target vehicle, wherein the use of the target-vehicle safety model in the target vehicle controls operations of one or more subsystems of the target vehicle.

18. The apparatus of claim 17, further comprising means for obtaining, from the safety-model request, target-vehicle-profile data that indicates one or more of a size of the target vehicle, kinematic capabilities of the target vehicle, and onboard-system configuration of the target vehicle.

19. The apparatus of claim 18, further comprising means for identifying the identified one or more source vehicles from one or more of:

one or more source vehicles having a different size than the target vehicle;

one or more source vehicles having different kinematic capabilities than the target vehicle; and one or more source vehicles having a different onboard-system configuration than the target vehicle.

20. The apparatus of claim 17, further comprising means for identifying that one or more source vehicles are in a vicinity of a current or expected location of the target vehicle.

21. The apparatus of claim 17, further comprising means for transforming data received from at least one identified source vehicle based on identified differences between the at least one identified source vehicle and the target vehicle.

22. The apparatus of claim 17, further comprising means for revising the target-vehicle safety model in response to receiving a model-revision request from the target vehicle.

23. The apparatus of claim 17, further comprising means for defining the target-vehicle safety model to provide a plurality of safety rules or criteria, the plurality of safety rules or criteria used to control the operations in the one or more subsystems of the target vehicle.

24. The apparatus of claim 17, further comprising means for instructing the one or more identified source vehicles to transmit model-feature data to the target vehicle for processing by the target-vehicle safety model.

* * * * *